United States Patent [19]

Sorenson

[11] Patent Number: 4,975,767
[45] Date of Patent: Dec. 4, 1990

[54] NTSC/PAL SUBCARRIER BASED H-LOCK WITH COLOR FRAMING AND DETECTION

[75] Inventor: Greg A. Sorenson, Tigard, Oreg.

[73] Assignee: Magni Systems, Inc., Beaverton, Oreg.

[21] Appl. No.: 342,996

[22] Filed: Apr. 25, 1989

[51] Int. Cl.[5] .............................................. H04N 9/44
[52] U.S. Cl. ......................................................... 358/19
[58] Field of Search .......................................... 358/19

[56] References Cited

U.S. PATENT DOCUMENTS

| 4,261,008 | 4/1981 | Waller et al. | 358/19 |
| 4,454,530 | 6/1984 | Yoshinaka et al. | 358/19 |
| 4,468,687 | 8/1984 | Munezawa et al. | 358/19 |
| 4,613,827 | 9/1986 | Takamori et al. | 358/19 |

Primary Examiner—John W. Shepperd
Attorney, Agent, or Firm—Flehr, Hohbach, Test, Albritton & Herbert

[57] ABSTRACT

A NTSC/PAL subcarrier based H-lock with color framing method is disclosed which makes possible color frame detection and a digital lock to horizontal sync on a NTSC or PAL video signal, using timing from a sync separator and an oscillator which is phase locked to the color burst of the input.

8 Claims, 5 Drawing Sheets

FIG.—1

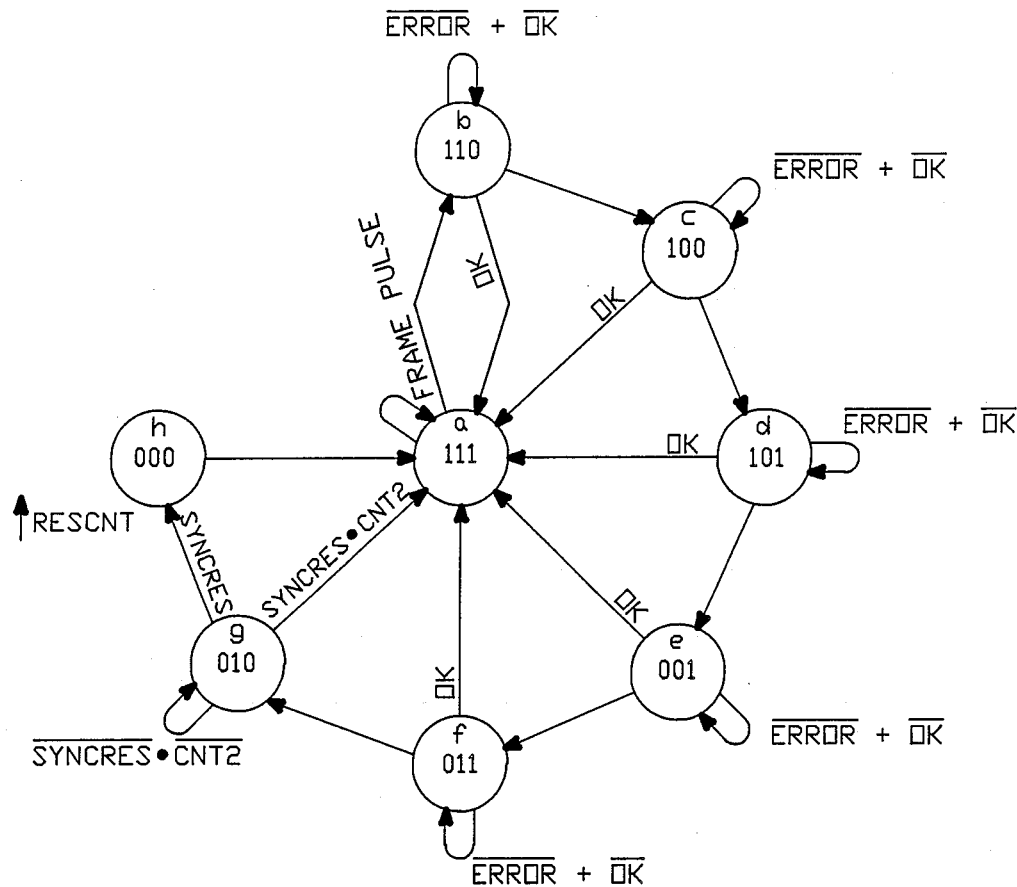

ERROR = CNT2·$\overline{\text{SYNCHYS}}$
OK = (CNT0 + CNT1 + CNT2) · $\overline{\text{SYNCHYS}}$

FOR NTSC

CNT 0 = 908 = $Q_9 \cdot Q_8 \cdot Q_7 \cdot \overline{Q}_6 \cdot \overline{Q}_5 \cdot \overline{Q}_4 \cdot Q_3 \cdot Q_2 \cdot \overline{Q}_1 \cdot \overline{Q}_0$ CNT 1 = 909 = $Q_9 \cdot Q_8 \cdot Q_7 \cdot \overline{Q}_6 \cdot \overline{Q}_5 \cdot \overline{Q}_4 \cdot Q_3 \cdot Q_2 \cdot \overline{Q}_1 \cdot Q_0$ CNT 2 = 910 = $Q_9 \cdot Q_8 \cdot Q_7 \cdot \overline{Q}_6 \cdot \overline{Q}_5 \cdot \overline{Q}_4 \cdot Q_3 \cdot Q_2 \cdot Q_1 \cdot \overline{Q}_0$

FOR PAL

CNT 0 = 1132 = $Q_{10} \cdot \overline{Q}_9 \cdot \overline{Q}_8 \cdot \overline{Q}_7 \cdot Q_6 \cdot Q_5 \cdot \overline{Q}_4 \cdot Q_3 \cdot Q_2 \cdot \overline{Q}_1 \cdot \overline{Q}_0$ CNT 1 = 1133 = $Q_{10} \cdot \overline{Q}_9 \cdot \overline{Q}_8 \cdot \overline{Q}_7 \cdot Q_6 \cdot Q_5 \cdot \overline{Q}_4 \cdot Q_3 \cdot Q_2 \cdot \overline{Q}_1 \cdot Q_0$ CNT 2 = 1134 = $Q_{10} \cdot \overline{Q}_9 \cdot \overline{Q}_8 \cdot \overline{Q}_7 \cdot Q_6 \cdot Q_5 \cdot \overline{Q}_4 \cdot Q_3 \cdot Q_2 \cdot Q_1 \cdot \overline{Q}_0$

FIG.—5

NTSC/PAL SUBCARRIER BASED H-LOCK WITH COLOR FRAMING AND DETECTION

BACKGROUND OF THE INVENTION

The present invention relates to an NTSC/PAL subcarrier based H-lock with color framing and detection.

Personal computer graphics programs and the requirements of broadcast video frequently present problems in order to provide true compatibility. One aspect of the compatibility is to provide color frame detection and digital lock to a horizontal sync pulse from an NTSC or PAL video signal.

The NTSC (National Television System Committee) standard is a standard which was named after an all-industry engineering group which developed U.S. color television specifications. The NTSC standard now describes the American system of color telecasting.

The PAL (Phase Alternation Line) standard pertains to a color television system in which the V component of subcarrier derived from a color burst is inverted in phase from one horizontal line to the next in order to minimize hue errors that may occur in color transmission.

The prior art has not been able to provide a single circuit which provides subcarrier based H-lock for both the NTSC and PAL standards. It would therefore be desirable to provide subcarrier based H-lock apparatus with the capability of color framing and detection whether with an NTSC or PAL video signal.

SUMMARY OF THE INVENTION

It is an object of the present invention to provide color frame detection and digitally regenerated horizontal sync pulses having a fixed SCH (SubCarrier to Horizontal) phase relationship to subcarrier whether from an NTSC or PAL video signal.

The present invention makes possible color frame detection and a digital lock described as digitally synchronized to horizontal sync to subcarrier, on a NTSC or PAL video signal, using timing from a sync separator and an oscillator which is phase locked to the color burst of the input and divided down to the horizontal line rate. Color frame detection is guaranteed for video inputs with an SCH phase of 0 degrees ±40 degrees. Once the color framing has been determined, there is a hysteresis added to the switching points to avoid jumping back and forth between color frames.

The present invention provides a digitally regenerated horizontal sync reference to be used to synchronize any horizontal timing with a fixed phase relationship to burst independent of the SCH phase of the input. The present invention incorporates a multiple line average when determining color framing to reduce the effects of noise. The present invention utilizes the relationships between burst phase, horizontal and vertical sync to determine the color frame. For PAL, the invention also takes advantage of the V axis switching (called PALPHASE from here on) in its color frame detection.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

FIG. 5 depicts a state diagram for the color frame detection controller of FIG. 1.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined the appended claims.

As previously described, the present invention makes possible color frame detection and a digital lock to horizontal sync, on a NTSC or PAL video signal, using timing from a sync separator and an oscillator which is phase locked to the color burst of the input. Color frame detection is guaranteed for video inputs with an SCH (Subcarrier to Horizontal) phase of 0 degrees ±40 degrees. Once the color framing has been determined, there is approximately 90 degrees of hysteresis added to the switching points to avoid jumping back and forth between color frames. This invention provides a regenerated horizontal sync reference to be used to synchronize any horizontal timing with a fixed phase relationship to burst independent of the SCH phase of the input. This invention incorporates a multiple line average when determining color framing to reduce the effects of noise.

The present invention utilizes the relationships between burst phase, horizontal and vertical sync to determine the color frame. For PAL, the invention takes advantage of the V axis switching (called PALPHASE from here on) in its color frame detection.

Figure 1:
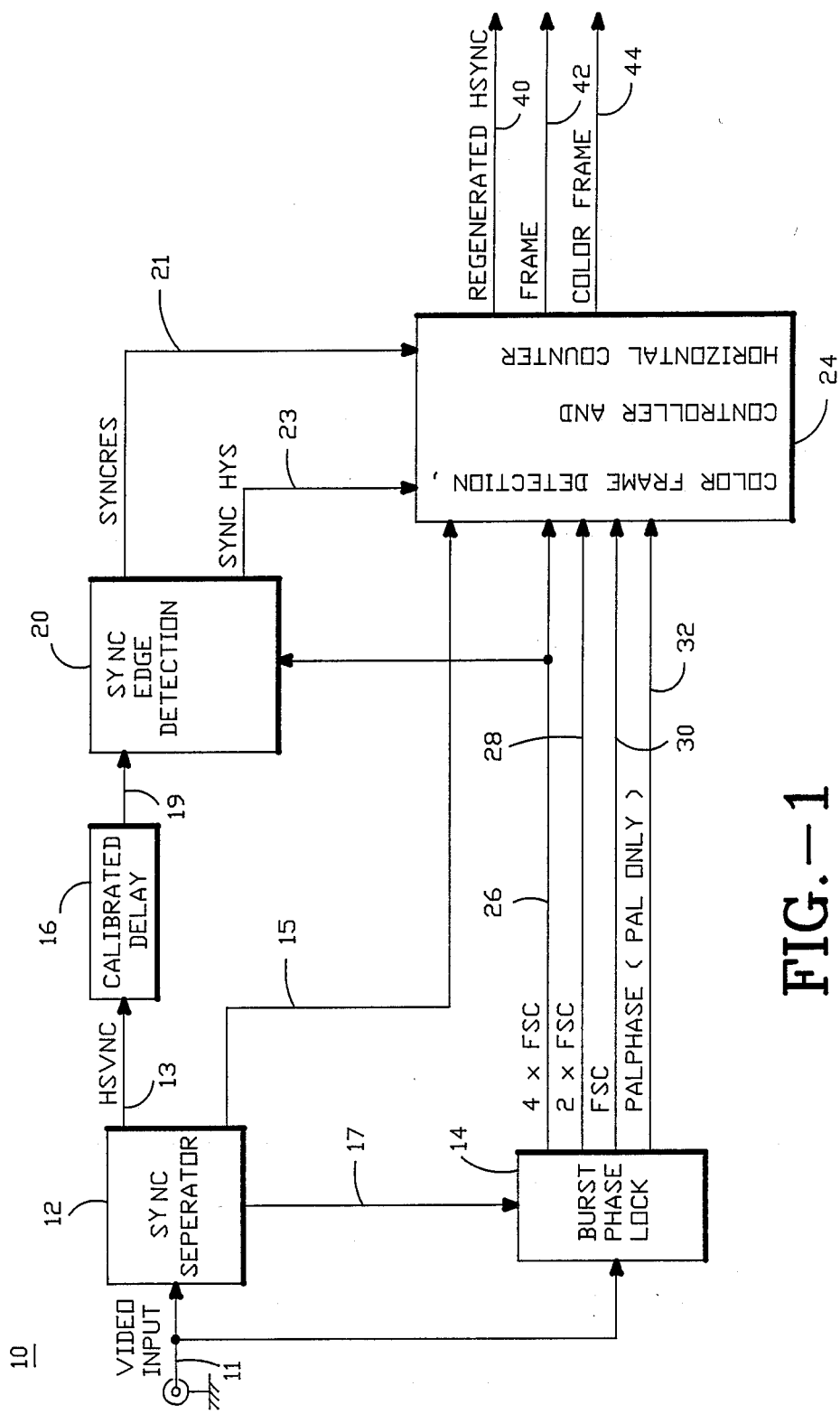
FIG. 1 depicts a block diagram of an NTSC/PAL subcarrier base H-lock with color framing and detection according to the present invention.

FIG. 1 shows the basic elements of the system according to the present invention. Sync separator 12 and burst phase lock 14 are well known components. Sync separator 12 and Burst Phase Lock 14 receive video input 11 (whether NTSC or PAL standard). Sync separator 12 provides the HSYNC signal 13 through Delay 16 to Sync Edge Detection 20. Separator 12 also provides a Frame Pulse signal 15 and Burst Gate signal 17. The Burst Phase Lock 14 provides the 4FSC signal 26, 2FSC signal 28, FSC signal 30 and Palphase signal 32.

The unique elements which make up this invention are implemented in the Sync Edge Detection 20 and Color Frame Detection Controller and Horizontal Counter 24.

The present system 10 provides detection of the horizontal sync position 13 using the 4xFSC (4 x Subcarrier)

clock 26 and provides reset and timing information to the color framing and lock controller 24.

Figure 2:
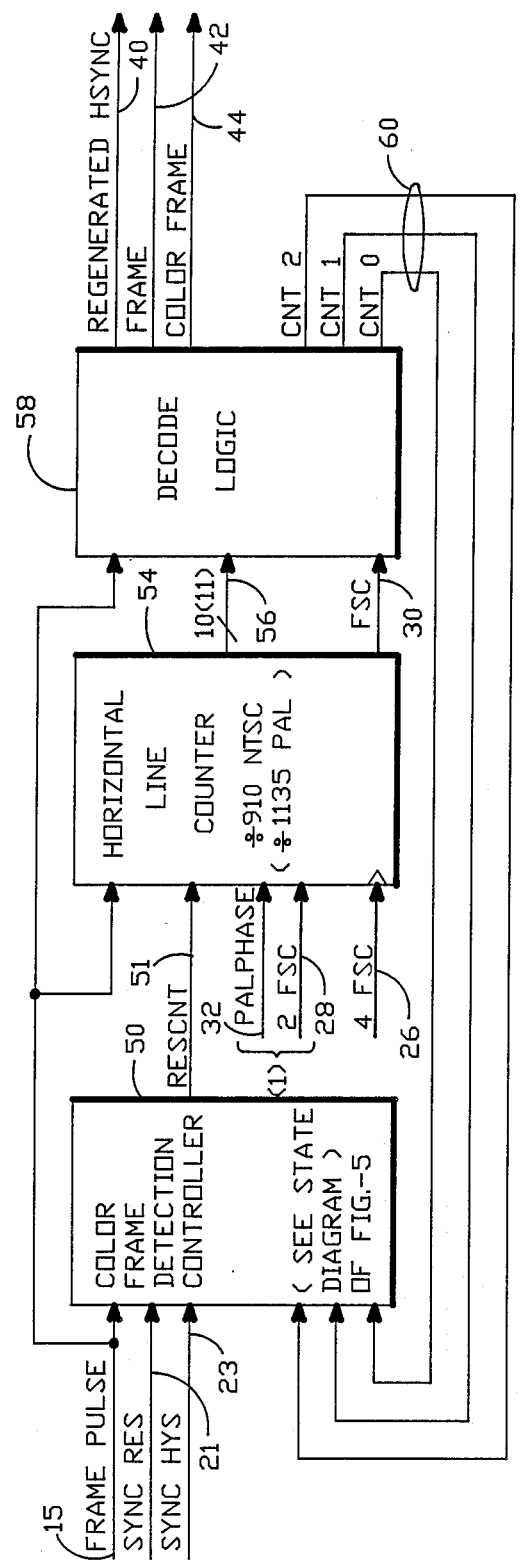
FIG. 2 depicts a diagram of a color frame detection and horizontal line counter which forms a portion of FIG. 1.

System 10 uses the 2xFSC clock 28 (and PALPHASE 32 for PAL) to synchronize the least significant bit (LSB) of line 56 horizontal counter 54 of FIG. 2 after a reset 51 from the controller 50. This provides a fixed phase relationship on the counter 54 with 2xFSC 28 as required for color framing.

In FIG. 2, the state machine controller 50 is used to monitor and perform a multiple line average of the sync relative to the horizontal counter 54 once per frame and reset the counter 54 when an error or change in color frame occurs. The controller 50 also provides for 90 degrees of hysteresis of SCH phase change following a color frame switch before it switches back.

Color framing is determined by sampling the phase of FSC 30 (and PALPHASE 32 for PAL) once per frame at a given horizontal count.

The PAL version drops four counts from the horizontal counter once per frame to compensate for the 25 Hz offset of subcarrier relative to sync.

Figure 3:
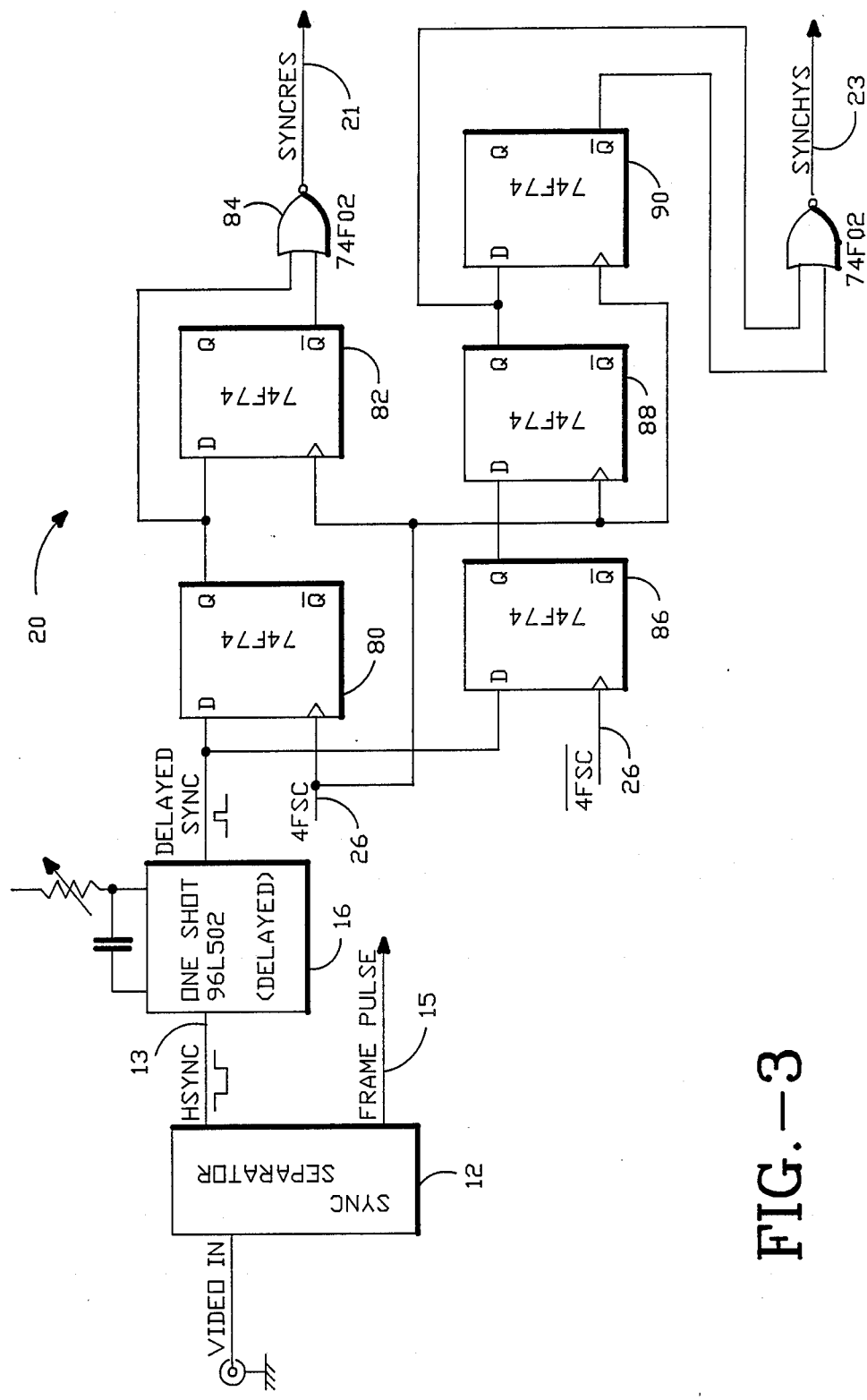
FIG. 3 depicts a diagram of a sync edged detection circuit which forms a portion of FIG. 1.

Sync edge detection 20 is shown in more detail in FIG. 3, basically comprising edge detection circuits 80, 82, 84 and 86, 88, 90 which output the pulses SYNCRES 21 and SYNCHYS 23 following the leading edge of the delayed HSYNC 19. The SYNCRES pulse 21 uses the 4xFSC clock 26 to capture the delayed HSYNC 19 relative to the rising edge of the 4FSC clock 26, providing a 90 degree increment of resolution for comparison to the burst phase. An important point to note is that color frame detection resolution is 180 degrees (half cycle of subcarrier) wide and has a fixed phase relationship to the 2xFSC clock 28. The Calibrated Delay block 16 provides a fixed delay calibrated such that a 0 degree SCH phased input falls in the middle of the effective 180 degree window, set up by 2xFSC 28. The SYNCHYS pulse 23 uses the /4xFSC clock 26 to capture the delayed HSYNC 19, providing a 90 degree increment of resolution, relative to the falling edge of the 4x FSC clock 26 used to resolve a 270 degree (0±135 degrees) hysteresis window within the Color Framing Controller 50 of FIG. 2. The hysteresis window provides some overlap of the region outside of the ±40° defined by SCH to prevent the erroneous jumping between detected color frames.

Figure 4:
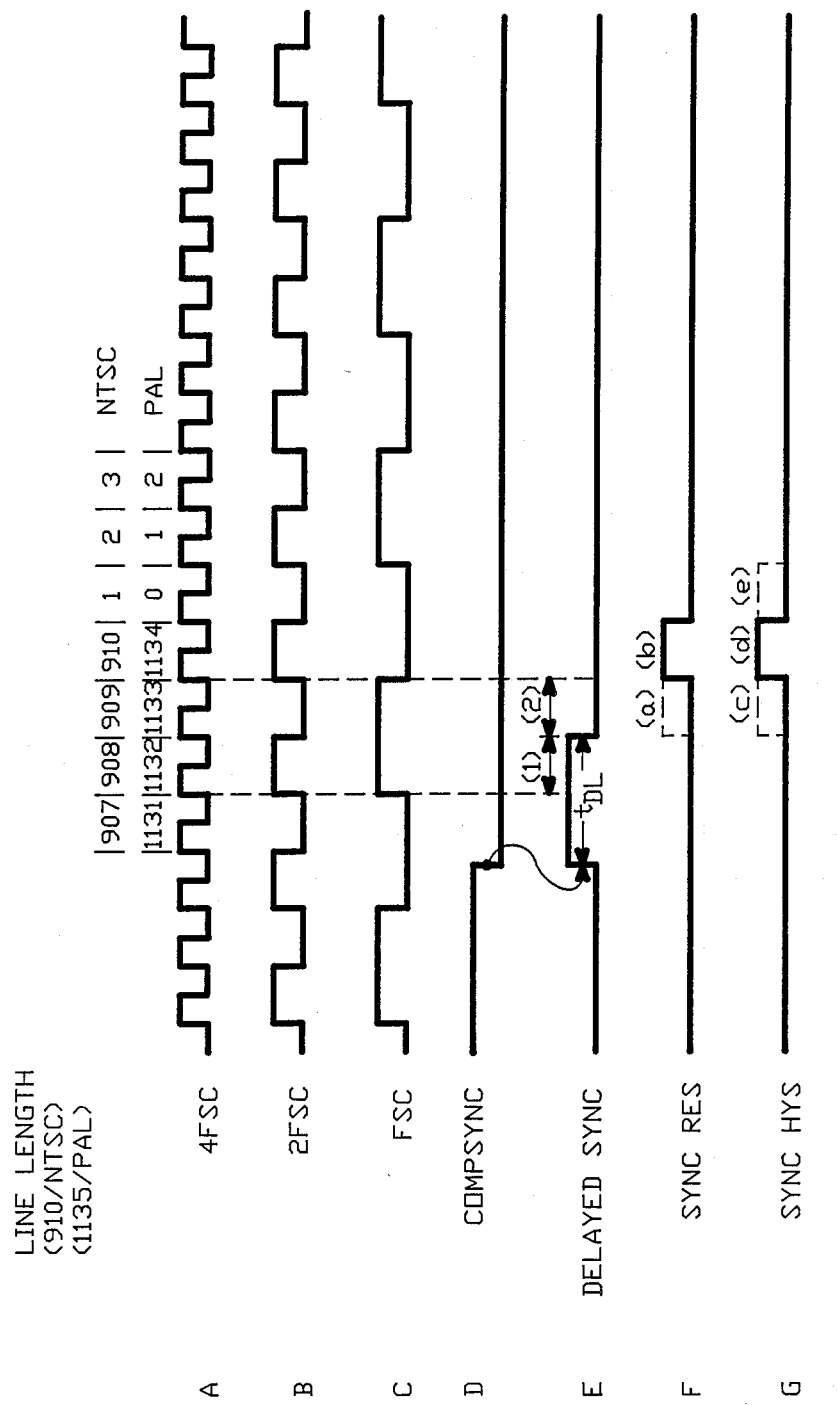
FIG. 4 comprising diagrams A–G depict timing diagrams for describing the operation of the sync edged detection aspect of the present invention.

FIG. 4 depicts a Sync Edge Detection diagram for the various signals, namely 4FSC (FIG. 4A); 2FSC (FIG. 4B); FSC (FIG. 4C); COMPSYNC (FIG. 4D); DELAYED SYNC (FIG. 4E); SYNCRES (FIG. 4F); and SYNCHYS (FIG. 4G).

In FIG. 4, for PAL, an 1135 line length derived from the PAL burst frequency within the 25 Hz offset, requires a once per frame correction to the line count by dropping four counts. This resets the relative position of SYNC to the line count so that a once per frame determination of color framing can be done.

Also in FIG. 4E, the $t_{DL}$ is adjusted to compensate for system delays using a known 0° SCH phased reference, and it is adjusted for a minimum ±40 switching angles, about 0°.

In FIG. 4F, the SYNCRES pulse is detected between (a) and (b). In FIG. 4G, the SYNCHYS pulse is detected between (c) and (e).

In FIG. 2, Color Frame Controller 50 is made up of a state machine which controls the Horizontal Line Counter 54 and provides a sequencer that monitors the SYNCRES pulses 21 relative to the line counter 54 at the start of each frame. Controller 50 basically looks to see if the SYNCHYS pulse 23 occurs at one of three defined horizontal counts, indicating that the delayed HSYNC 19 is within the ±135 degree hysteresis window at least one 6-line period following the occurrence of a FRAME PULSE 15. If no SYNCHYS pulses 23 occur coincident to the defined counts, then an error condition is flagged and the Horizontal Line Counter 54 is reset on the next occurrence of SYNCRES 21. It is important to note that with PAL there is a 25 Hz offset added to the subcarrier frequency, causing a one subcarrier cycle slew of the U component of the burst over the duration of a frame. The reason the controller 50 looks only at the frame boundary and over a short number of lines is because the phase of sync relative to the U component of the burst is defined with slight modification due to the 25 Hz offset, and the phase shift due to the 25 Hz offset over 6 lines is approximately 3.5 degrees.

Horizontal Line Counter 54 divides the 4xFSC clock 26 down to horizontal rate. For NTSC, the counter 54 divides by 910 and for PAL the counter 54 divides by 1135. There is a need to have the Horizontal Line Count phased to the 2xFSC clock 28. The SYNCRES pulse 21 can reset counter 54 on either phase of the 2xFSC clock 28 due to the 90 degree resolution of SYNCRES 21 and 4xFSC clocking of counter 54. Proper phasing of counter 54 occurs by comparing the phase of 2xFSC clock 28 to the LSB of counter 54 (which is also at a 2xFSC rate). If the LSB and 2xFSC are out of phase, the counter LSB is brought into phase by dropping or adding one count. With PAL, the 2xFSC clock flips phase line by line relative to the LSB (i.e., 1135 doesn't divide by 2). Here, the LSB is compared to the exclusive "OR" of the 2XFSC 28 and PALPHASE 32. The PALPHASE 32 output of the burst phase lock block 14 of FIG. 1 is an output which follows the phase of the +/− V axis switching on burst and toggles line to line.

Once the Horizontal Line Counter 54 is reset and synchronized to the 2xFSC clock 28 (and PALPHASE 32 for PAL), color frame detection is accomplished by sampling the level of the FSC clock 30 (and PALPHASE 32 for PAL) once at a given count following the FRAME PULSE 15. In NTSC, there are two color frames made up of two frames of video. The latched level of FSC 30 at the same location within a line, a frame apart, will produce a 2-frame rate square wave resolving color frames 1 and 2. In PAL, the color frames are made up of two frames of video for each color frame. Sampling the level of PALPHASE 32 a frame apart will resolve two frame sequence because its line to line alternation produces a two-frame cycle. The latched level of FSC 30 at the same location within a line, at two frames apart, will produce a 4-frame rate square wave resolving color frames 1 and 2. Note that FSC for PAL yields a ¼ cycle offset per frame, so it takes four frames to get back to the same phase at a given point in the frame.

FIG. 5 shows a state diagram for the color frame detection controller of FIG. 2, and Appendix A shows an illustrative code for the present invention.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the present invention be defined only by the claims appended hereto.

What is claimed is:

1. A multi-standard subcarrier based horizontal lock apparatus comprising
    means for receiving a first standard video signal or a second standard video signal,
    sync separator means responsive to the first or second video signals for providing a delayed horizontal sync signal and a frame pulse signal,
    burst phase lock means responsive to said first or second video signals for providing timing control signals including a subcarrier signal, and
    sync edge detection means responsive to said delayed horizontal sync signal and to said timing control signals for providing a sync reset signal and a sync hysteresis signal which follow the leading edge of said delayed horizontal sync pulse.

2. A multi-standard subcarrier based horizontal lock apparatus comprising
    means for receiving a first standard video signal or a second standard video signal,
    sync separator means responsive to the first or second video signals for providing a delayed horizontal sync signal and a frame pulse signal,
    burst phase lock means responsive to said first or second video signals for providing timing control signals, including a subcarrier based signal,
    sync edge detection means responsive to said delayed horizontal sync signal and to said timing control signals for providing a sync reset signal and a sync hysteresis signal which follow the leading edge of said delayed horizontal sync pulse, and
    control means responsive to said timing control signals, said frame pulse signal, said sync hysteresis signal and said sync reset signal for providing a regenerated horizontal sync signal.

3. The apparatus as in claim 2 wherein said control means include means for providing a frame signal.

4. The apparatus as in claim 3 wherein said control means include means for generating a color frame signal.

5. The apparatus as in claim 4 wherein said control means include a horizontal counter for counting the number of horizontal clocks per line depending on whether said video signal is a first standard or a second standard video signal.

6. The apparatus as in claim 5 wherein said control means include decode logic means and color frame detection control means for providing said regenerated horizontal sync signal.

7. The apparatus as in claim 6 wherein said decode logic means include means for generating said frame signal.

8. The apparatus as in claim 7 wherein said decode logic means include means for generating said color frame signal.

* * * * *